(12) United States Patent
Bohm et al.

(10) Patent No.: US 6,430,180 B1
(45) Date of Patent: Aug. 6, 2002

(54) METHOD AND APPARATUS FOR SWITCHING DATA BETWEEN BITSTREAMS OF A TIME DIVISION MULTIPLEXED NETWORK

(75) Inventors: Christer Bohm, Nacka; Lars Gauffin, Ronninge; Lukas Holm, Stockholm; Joachim Roos, Nacka, all of (SE)

(73) Assignee: Net Insight AB (SE)

( * ) Notice: Subject to any disclaimer, the term of this patent is extended or adjusted under 35 U.S.C. 154(b) by 0 days.

(21) Appl. No.: 09/565,205

(22) Filed: May 4, 2000

Related U.S. Application Data

(63) Continuation of application No. PCT/SE98/02003, filed on Nov. 5, 1998.
(60) Provisional application No. 60/066,477, filed on Nov. 26, 1997.

(30) Foreign Application Priority Data

Nov. 6, 1997 (SE) ............................... 9704067

(51) Int. Cl.[7] ............................................. H04Q 11/04
(52) U.S. Cl. ..................................................... 370/369
(58) Field of Search .................................. 370/441, 535, 370/537, 501, 502, 503, 442, 389, 428, 413, 351, 352, 347, 342, 369, 371, 372, 358, 360, 363, 367, 370, 368, 374, 375, 376, 378, 379, 380, 381, 506, 507, 509, 510, 512, 468, 465, 437, 337

(56) References Cited

U.S. PATENT DOCUMENTS

| 4,005,272 | A |   | 1/1977 | Collins et al. ......... 179/15 AQ |
| 4,603,416 | A | * | 7/1986 | Servel et al. ................ 370/422 |
| 4,809,261 | A |   | 2/1989 | Ratcliff .......................... 370/59 |
| 5,128,929 | A |   | 7/1992 | Kobayashi ................. 370/58.1 |
| 5,323,390 | A | * | 6/1994 | Pawelski ..................... 370/391 |
| 5,619,563 | A | * | 4/1997 | Dent ........................... 370/335 |
| 5,631,898 | A | * | 5/1997 | Dent ........................... 370/330 |

* cited by examiner

Primary Examiner—Dang Ton

(57) ABSTRACT

A method and an apparatus for switching data between a set of input bitstreams and a set of output bitstreams in a circuit switched time division multiplexed network is presented. Each bitstream is divided into recurring frames and each frame is divided into time slots. Each one of the input bitstreams is received, and frames of time slot data thereof are temporarily stored in a set of memories. Each of the memories is used for storing frames of a respective bitstream of the input bitstreams. For each frame of each one of the output bitstreams, and sequentially in accordance with the order that the time slot data are to be transmitted in the respective output frame, time slot data is selectively read from frames presently temporarily stored in the set of memories, and is then transmitted into allocated time slots of the output bitstreams.

28 Claims, 7 Drawing Sheets

| Output | Input port | Slot number | Page offset |
|---|---|---|---|
| 0 | 3 | 15 | 0 |
| 1 | Unallocated | - | - |
| 2 | 2 | 3988 | 1 |
| 3 | 1 | 3 | 2 |
| ... | ... | ... | ... |
| Last slot | 2 | 1501 | 1 |

*Fig. 3*

METHOD AND APPARATUS FOR SWITCHING DATA BETWEEN BITSTREAMS OF A TIME DIVISION MULTIPLEXED NETWORK

CROSS REFERENCE TO RELATED APPLICATIONS

The present application is a continuation of International Application No. PCT/SE98/02003 filed Nov. 5, 1998, designating the United States of America, incorporated herein by reference, which PCT application claims priority of U.S. Provisional Application Serial No. 6/0066,477 filed Nov. 26, 1997.

TECHNICAL FIELD OF INVENTION

The present invention refers to a method and an apparatus for switching data between a set of input bitstreams and a set of output bitstreams in a circuit switched time division multiplexed network, each of said bitstreams being divided into recurring frames and each of said frames being divided into time slots.

TECHNICAL BACKGROUND AND PRIOR ART

Today, new types of circuit switched communication networks are being developed for the transfer of information using time division multiplexed bitstreams, wherein the bitstreams of the network are divided into recurrent, typically fixed size frames, each frame in turn being divided into time slots.

An example of such a network, referred to as a DTH (Dynamic synchronous Transfer Mode) network, is described in "The DTM Gigabit Network", Christer Bohm, Per Lindgren, Lars Ramfelt, and Peter Sjödin, Journal of High Speed Networks, 3(2):109–126, 1994, and in "Multi-gigabit networking based on DTM", Lars Gauffin, Lars Håkansson, and Björn Pehrson, Computer networks and ISDN Systems, 24(2):119–139, April 1992.

In such a network, so called switch nodes, each connected to at least two bitstreams, are used to switch time slot data between different bitstreams, more specifically between time slot positions on different bitstreams. If, for example, a circuit (or "channel") is defined by a first set of time slot positions on a first bitstream and a second set of time slot positions on a second bitstream, a switch node is typically used to transfer or copy time slot data from the first set of time slot positions to the second set of time slot positions.

According to prior art, switches in circuit switched time division multiplexed networks use control memories that map incoming slot positions to outgoing slot positions. Such mapping may involve both a mapping in the time domain, i.e. control of the order in which time slot data are written into each bitstream, and a mapping in the space domain, i.e. controlling which time slot data goes to which bitstream. For general background, so-called time-space-time (TST) switches are described in "Data and Computer Communications", 4th ed., by Williams Stallings, Macmillan Publishing Company.

As an example of prior art switches, U.S. Pat. No. 4,005,272 (Collins et al.), describes a switch apparatus wherein incoming bitstream frames are stored in respective inlet memories and wherein outgoing bitstream frames are stored in respective outlet memories. Based upon information provided in a plurality of control memories, time slot data stored in said inlet memories are transferred to said outlet memories via a space switch. A first control memory is used to designate the inlet memory entry that is currently connected to the space switch, thereby providing a time switching function at the inlet port. Another control memory is used to designate the outlet memory entry that is currently connected to the space switch, thereby correspondingly providing a time switching function at the outlet port. Also, further control memories are provided to control which cross-connections that are to be made over within the space switch.

A disadvantage of switch nodes of the above mentioned kinds is that they do not allow arbitrary communication between input and output ports, i.e. they show limitation as to the possibilities of arbitrary switching time slots in space and time, which consequently also limits switching speed and capacity. Because of the operation features of a space switch of the kind used in, e.g., U.S. Pat. No. 4,005,272, any-to-any switching is typically rendered impossible. In most cases, a first selection of mapping of a specific input time slot position to a specific output time slot position will directly imply restrictions as to a second selection of further mapping. This of course also limits the possibilities of providing space and time multicasting and/or broadcasting.

Furthermore, in prior art, input and output ports are connected together using a shared medium that handles the aggregated switching capacity of the input ports to not provide blocking. This typically requires switch internal processing at a bit rate of several times the bit rate of the network bitstreams, which of course limits the scalability of such a design.

OBJECTS OF THE INVENTION

An object of the invention is to provide a switching apparatus and method that provides greater freedom as to the possibilities of arbitrarily switching time slots in space and time.

Another object of the invention is to provide a solution that efficiently handles time and space multicasting and broadcasting channels.

Another object of the invention is to provide a simple and fast mechanism for switching between multiple incoming and outgoing bitstreams which are arbitrarily phase shifted.

Another object of the invention is to increase the general switching speed and capacity.

Yet another object of the invention is to provide a scaleable switching system, wherein smaller switches may easily be integrated into forming larger switches.

SUMMARY OF THE INVENTION

The above mentioned and other objects are achieved by the invention as defined in the accompanying claims.

According to the invention, there is provided a method and an apparatus for switching data between a set of input bitstreams and a set of output bitstreams in a circuit switched time division multiplexed network, each of said bitstreams being divided into recurring frames and each of said frames being divided into time slots. The input bitstreams are received and the frames thereof are temporarily stored in a set of memory means (for simplicity referred to below as a set of frame buffers). Each frame buffer is used for temporarily storing frames of a respective bitstream of said input bitstreams. For each frame of each one of said output bitstreams and in sequence accordance with the order that said time slot data is to be transmitted therein, time slot data is selectively read from frames temporarily stored in said set of frame buffers. Said time slot data, as selectively read from said frame buffers, are then transmitted into allocated time slots of said output bitstreams.

Consequently, in a switch embodying the invention, each input port is associated with a respective frame buffer for temporary storing of frames that are received at said input port. All output ports can, independently of one another, read data from any one or more of said frame buffers in a non-blocking manner. A full switch thus comprises a set of frame buffers, each being arranged in a 1-to-many (one input to many outputs) fashion.

According to the invention, time and space switching is advantageously accomplished in one single integrated step by the selective reading of data from the frames that are stored in said set of frame buffers, only requiring one single read control function (for example implemented using a so called slot mapping table) for controlling said selective reading for each output bitstream.

Furthermore, as each input bitstream is written into a respective frame buffer, and time slot data for the output bitstreams are read out from said frame buffers as requested for output, a switch according to the invention will only have to be able to operate at a rate essentially corresponding to the bitstream bit-rate. However, this does not prevent the invention from being used in relation to memory means operating at a bit-rate exceeding wire speed.

Also, using the invention, no multiplexing of time slots from different bitstreams is needed at the input side (or corresponding demultiplexing at the output side) of the memory means, in contrast to what is often encountered in prior art.

According to a preferred embodiment of the invention, said frame buffers are realized by means of multiported random access memories (RAM), which allows insertion and retrieval to be performed independently and without phase synchronization.

By using RAMs with multiple read ports, each output bitstream will, independently of others, retrieve its own time slot data and preferably collect it using lines private to said output bitstream, thus providing a non-blocking operation. Therefore, there is no need for mutual exclusion or complicated reservation schemes on a shared resource. It also follows that the concept does not require a higher communication Speed in any part of the design compared to the speed at which each line receives input or transmits output. Consequently, a switch embodying the invention will show a significant freedom of operation with respect to the possibilities of arbitrary switching of time slots in time and space as compared to prior art switches.

As is understood, a multi-ported random access memory as suggested above may provide a plurality of actual physical read ports or, for example, one single physical port that in turn provides a plurality of virtual read ports (one private to each output port), as long as the memory means provides support for a selective read access (in the time slot sequential order of the respective output frame) to the output ports as suggested according to the invention. Consequently, as mentioned above, operation within the memory means as such may still, if so desired or required, use a bit rate that exceeds the bitstream bit-rate.

As the frame buffers are repeatedly updated at a high rate, an implementation based on dynamic RAM (DRAM) can be envisaged without a need for memory refresh.

As mentioned, according to a preferred embodiment of the invention, all output ports read data from said set of frame buffers independently of one another, and the time slot data is preferably transferred from said frame buffers to the output ports on lines private to each output port.

Typically, each one of said frame buffers will comprise a plurality of time slot data entries, wherein each time slot data entry of a frame buffer is arranged to store time slot data from a respective recurring time slot position in the sequence of time slots of the input bitstream that is associated with said frame buffer.

Since time slot data may be read from any time slot entry of said frame buffers to different output ports, the mechanism for broadcasting and multicasting (i.e. sending data from one input port to several output ports) is implicitly provided.

Preferable, a switch apparatus according to the invention comprises means, for example in the form of a control memory ("slot mapping table"), for providing, for those time slots of a frame of each output bitstream that are allocated to receive time slot data from the input bitstreams, each one thereof with a respective identification of an associated time slot data entry of said frame buffers, said time slot data entry providing the time slat data for the respective allocated time slot.

Such an identification may for example be an identification uniquely identifying a frame buffer and an entry thereof providing the time slot data to be transmitted into the output time slot associated with said identification, an identification stating that write access to the corresponding output time slot does not belong to the switch and that the output time slot shall not be provided with time slot data from said input bitstream, an identification that an idle pattern shall be generated by the switch and transmitted into the corresponding output time slot, or an identification that time slot data received from another switch shall be transmitted into said corresponding time slot. Thus the designation of where from to collect data for each output time slot provides several new possibilities for switching data. For example, the latter of the four exemplified types of identifications above makes it possible to connect several switches in a simple manner into forming a larger switch, thereby increasing the switching possibilities without essentially complicating implementation.

Preferably, each input frame buffer has capacity to hold three sequential frames of the input bitstream in respective frame storage areas, also referred to as frame pages or columns, of said frame buffer. The use of three frame pages per input bitstream is meant to ensure switching consistency, i.e. making sure that the selective reading from a frame or page does not take place before the input writing of that specific frame or page is completed. According to the preferred embodiment, one page is needed to enable re-mapping of time slot in the time domain, another one is needed for parallel storage in a double buffering fashion, and the third page is needed to handle any frame phase difference between the input port writing into said frame buffer and the output ports reading from said frame buffer, a difference which is constrained to one page as a result of the general synchronization of, for example, a DTM network.

Each one of the input and output ports is typically controlled by a respective frame synchronization signal, which in turn advances internal pointers to identify the frame page currently used for writing (at an input port) or the frame pages that are currently used for reading (at an output port). The time slots of an input bitstream are written into storage in sequential order, while the outputs are read from said frame buffers using random access among the entries of the pages currently selected for selective reading.

Time slots and frames are hence clocked using clock and frame synchronization signals local to each port, and the frame buffers are accessed by the ports according to the respective local frame synchronization. An underlying assumption is that the frame synchronization signals never have a skew, i.e. a phase difference between an input bitstream and an output bitstream, of more than one frame, i.e. there is no accumulated frame difference (drift), which is a criteria that is accomodated in, for example, a DTM network, the invention therefore being of special intererst in such a network.

The frame synchronization of an input bitstream preferably controls a write slot counter, which advances a write pointer designating a time slot entry of the respective frame buffer to the next time slot entry upon each received time slot (Upon frame synch, the write slot counter is preferably reset to start at the lowest slot in the next frame). The frame synchronization of the input bitstream preferably also controls a write page select block, one designating a page of the respective frame buffer, which enables one of the three frame pages of the buffer for write access. (Upon frame synch, the next frame page is selected in a circular fashion.)

The frame synchronization of an output bitstream preferably controls an output slot counter, which at each output time slot advances a pointer in said time slot table for deriving information as to where time slot data for the subject output time slot is to be collected. (Upon frame synch, the output slot counter is preferably reset to start at the lowest slot in the next output frame). The frame synchronization of the output bitstream preferably also controls a read page select block, which selects which frame pages, of respective frame buffers, that may currently be used for selective read access. Upon frame synch, the next page is selected in a circular fashion.

Accordingly, one advantage of the invention is that control of the operation at each port of the switch is provided by a frame synchronization local to each respective port, thus eliminating the need for providing complicated cross-related synchronization mechanism between the different input and output ports.

According to a further developed embodiment of the invention, said read page selection is also controlled by a so called page offset and bypass feature, as activated on a slot per slot basis by the slot mapping table. The bypass mode provides the option to gain read access one frame ahead of the actual read access pointer, which reduces the latency through the switch but puts constraints on the slot allocation in order to ensure that no access conflict or inconsistency occurs during time domain re-mapping.

According to yet another embodiment of the invention, a mechanism for performing automatic updates of the slot mapping tables is provided, i.e. to simultaneously update more than one time slot table and more than one time slot entry thereof in a fashion which preserves consistency.

A preferable implementation of switching according to the invention is in a DTM network. The basic topology of a DTM network is preferably a bus with two unidirectional, multi-access optical fibers connecting a number of nodes. Note, however, that the topology may just as well be realized by any other kind of structure, e.g. a ring structure or a hub structure.

The bandwidth of each wavelength on the bus, i.e. each bitstream on each fiber, is divided into fixed length, typically 125 µs, frames which in turn are divided into fixed size, typically 64 bit, time slots. The number of slots in a cycle thus depends on the network's bit-rate. The time slots are divided into two groups, control slots and data slots. Control slots are used for transferring of signaling messages between said nodes for the network's internal operation. The data slots are used for the transfer of data between end users or applications using said nodes for access to the DTM network.

The nodes of the DTM network are typically arranged to dynamically establish, modify, and terminate channels on said bitstreams by dynamically allocating selected time slots to the respective channel. Hence, the allocation of both time slots and data slots to different nodes or end users may be dynamically adjusted as network load changes. As is understood, there is essentially no header or address information embedded in the data slots in this kind of circuit switching.

For a more detailed description of the DTM technology, reference is made to the above mentioned references "The DTM Gigabit Network" and "Multi-gigabit networking based on DTM".

The above mentioned and other aspects and features of the invention will be more fully understood from the following description, with reference to the accompanying drawings, of exemplifying embodiments thereof.

BRIEF DESCRIPTION OF THE DRAWINGS

Exemplifying embodiments of the invention will now be described with reference to the accompanying drawings, wherein:

FIG. 3 schematically shows an embodiment of a slot mapping table of the kind used in the switch shown in FIG. 2;

DETAILED DESCRIPTION OF PREFERRED EMBODIMENTS

Figure 1:
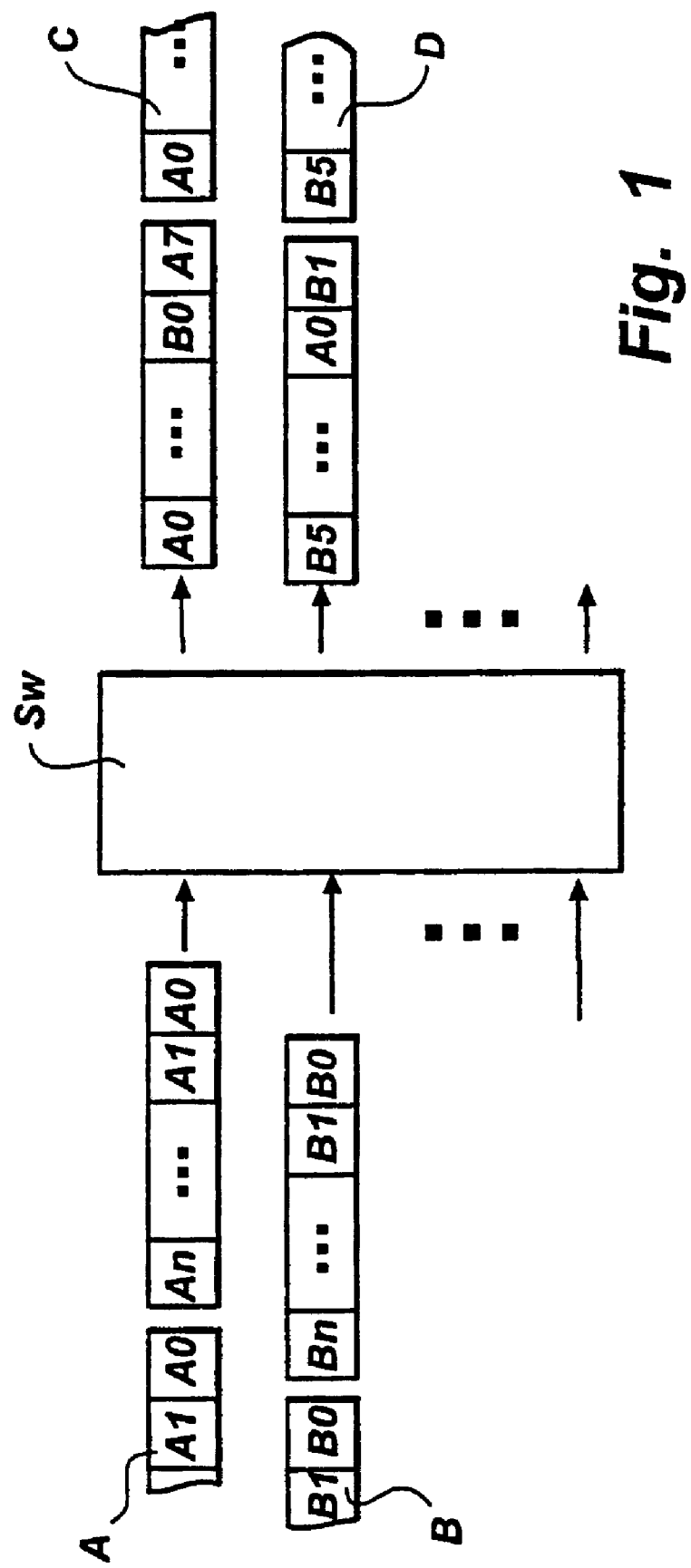
FIG. 1 schematically shows a switch apparatus performing time and space switching of time slot data.

In FIG. 1, a switch apparatus Sw is shown for switching data between a set of input bitstreams and a set of output bitstreams in a circuit switched time division multiplexed network, each of said bitstreams being divided into recurring frames and each of said frames being divided into time slots. More specifically, the switch apparatus Sw in FIG. 1 is provided to switch time slot data from time slots $A_0$–$A_n$, $B_0$–$B_n$ of frames of input bitstreams A and B in time and space to time slots of frames of second bitstreams C and D. As is shown in FIG. 1, an output frame of the bitstream C consists of data transferred from any selected one or more of the input bitstreams A, B and from selected arbitrary input time slots thereof. The occurrence of $A_0$ in the frames of both output bitstreams C and D corresponds to multicasting the content of the $A_0$ input slot to both the C and D output bitstreams, but no different slots in the outgoing frame.

Figure 2:
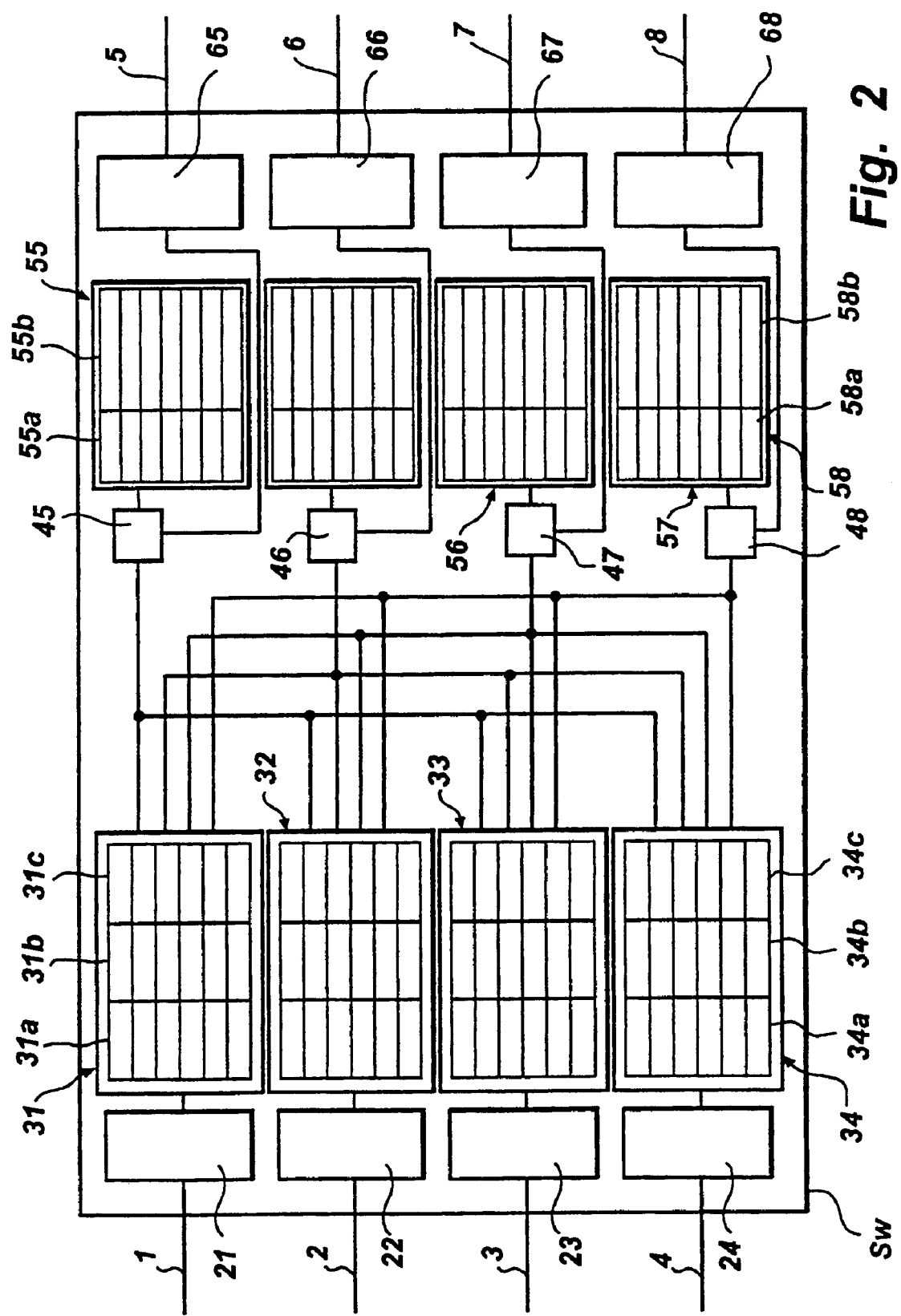
FIG. 2 schematically shows a switch apparatus according to an embodiment of the present invention.

A switch apparatus according to an exemplifying embodiment of the invention will now be described with reference to FIG. 2. In FIG. 2, the switch Sw, receives time slot data from four input bitstreams 1–4 and transmits time slot data to four output bitstreams 5–8. Accordingly, the switch Sw comprises four input medium access units 21–24 and four output medium access units 65–68 providing access to the respective bitstreams.

Each input medium access unit 21–24 is arranged to write each frame received from the respective bitstream into a respective frame buffer 31–34. Each frame buffer 31–34 has capacity to store three sequential frames of the respective bitstream in three corresponding frame storage areas or pages, 31a–31c, 32a–32c, 33a–33c, and 34a–34c, each page having capacity to store one frame.

For example, the frame buffer 31, which temporarily stores each frame received from the bitstream 1 via the input medium access unit 21, will sequentially store a first frame in frame page 31a, the next (second) frame in frame page 31b, and the following (third) frame in frame page 31c. Then, the following (fourth) frame will be stored again using frame page 31a, thus overwriting the previously stored first frame. Also, note that the time slot data from the time slots of a frame are written sequentially into corresponding time slot data entries of the respective frame pages, i.e. one data entry for each input time slot.

At the same time, four time slots data selection units 45–48, which, as illustrated in embodiments to be described below, may be provided, e.g., in the form of multiplexors or tri-state buses, are arranged to select time slot data to be transmitted into the respective output bitstreams 5–8 by deciding, for each output time slot to be transmitted into the respective output bitstreams, which frame buffer, and frame page thereof, and time slot data entry thereof (i.e. among the pressently stored time slot data from all four input bitstreams 1–4) is to be collected, or passed on, to the respective output bitstream. Hence, each selection unit 45–48 is connected to all four frame buffers 31–34 for the selection and collection of time slot data therefrom.

In order to know which frame buffer, page and entry thereof to be used for a specific output time slot, each selection unit 45–48 has access to a respective slot mapping table 55–58, which will be described in more detail below with reference to FIG. 3 and which, for each time slot of the respective output bitstream frame and at a respective entry, provides one field 55a–58a designating the frame buffer and one field 55b–58b designating the entry thereof to be used for reading time slot data for the output time slot. The output time slot entries of the slot mapping tables 55–58 are preferably stored in the time sequential order of the corresponding output frame, and each slot mapping table is stepped through once each frame of the respective bitstream.

Hence, when reading time slot data for the first time slot in each frame of bitstream 5, the selection unit 45 will access the first entry of the slot mapping table 55, more specifically the first data field of the column 55a and the first data field of the column 55b, to derive information as to which one of the four frame buffers and which entry thereof that time slot data is to be collected for the first output time slot of the frame of the bitstream 5. Also, the selection unit 45 will control the selection of which frame page of each frame buffer 31–34 that is to be used for reading time slot data for the frame currently being transmitted into the bitstream 5, as will be described in more detail below. Accordingly, the selection unit will pick time slot data in given output order for each output bitstream time slot that is set to receive time slot data. Of course, the switch Sw will only transmit time slot data into those slots of the output bitstream allocated for that purpose.

An embodiment of a slot mapping table of the kind discussed above with reference to FIG. 2, (and below with reference to FIG. 7), will now be described with reference to FIG. 3. The slot mapping table is a table in which the allocated channels are defined. As shown in FIG. 2, there is preferably one slot mapping table for each output bitstream. The slot mapping table shown in FIG. 3 is one frame deep and contains four logical memory areas or columns 12–18, each column comprising a number of fields corresponding to the number of time slots in the output frame, so that each entry, comprising one field from each column, uniquely identifies an input bitstream and a time slot thereof for each output time slot. The first column 12 identifies the time slot position in the outgoing frame. Each field of the second column 14 (also schematically illustrated at 55a in FIG. 2) defines an input bitstream (or input frame buffer), and each field of the third column 16 (also schematically illustrated at 55b in FIG. 2) defines a time slot thereof (or a frame buffer data entry thereof), and the fields of the fourth column 18 define a frame page offset that will be discussed more in detail below with reference to FIGS. 4, 5a, and 5b. For each sequential output slot, i.e. for each sequential entry of the slot mapping table, the slot mapping table thus defines the slot schedule in the output frame and incorporates switching in both the time and space domains.

The entries of the slot mapping table are scanned in sequential order once every outgoing frame, to define the mapping of each output time slot thereof, and the output of the slot mapping table directly designates the associated time slot data from the frame buffers. Thus, only a simple counting mechanism, as will be discussed below, is required for the generation of sequential addresses to the slot mapping table, which translates those into random references used for data retrieval in the buffers.

Thus, using the exemplifying slot mapping table shown in FIG. 3, the first time slot of each output frame associated with the shown slot mapping table will contain time slot data from the fifteenth time slot of each frame of the third input bitstream, the second output time slot will not be provided with data from any incoming bitstream, optionally resulting in the writing of an idle bit group if write access to the second output time slot is allocated for use by the switch apparatus, time slot data for the third output time slot will be fetched from the 3988:th time slot of each frame of the second input bitstream, and so on.

A frame page selection mechanism to be used at each input and output port will now be described with reference to FIGS. 4, 5a, and 5b. The input of time slot data to the frame buffers, as well as the selective reading of output time slot data using the slot mapping tables, are each controlled by separate and independent frame synchronization signals, derived from or defined for the respective bitstreams, which together make the switch consist of N (number of inputs) plus M (number of outputs) clocking domains. The frame synchronization signals are used to advance respective writing or reading pointers that select frame pages in the respective frame buffers.

Figure 4:
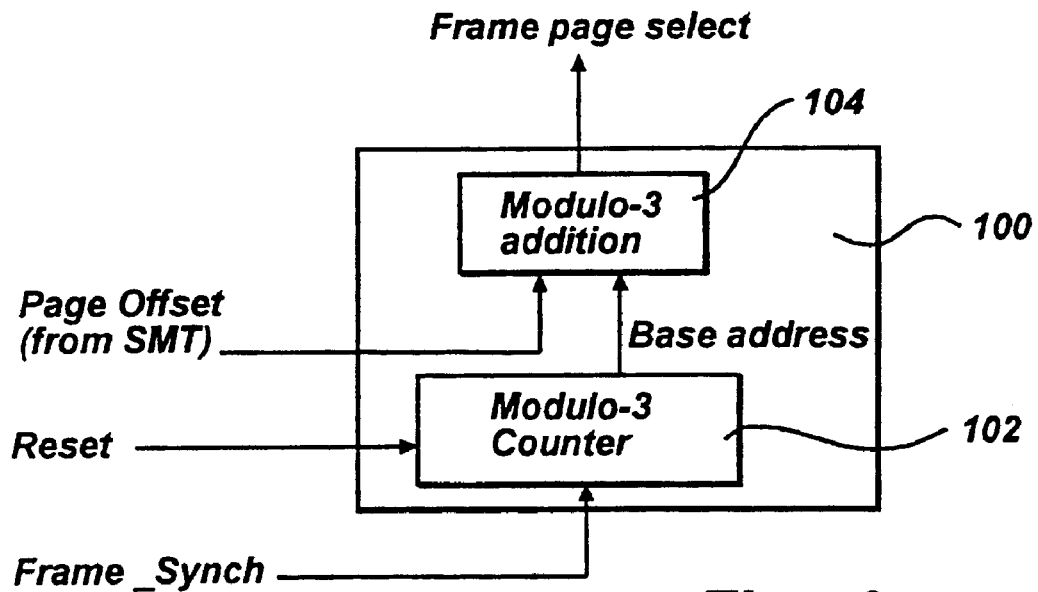
FIG. 4 schematically shows a frame page selection mechanism used at each input and output port of a switch according to a preferred embodiment of the invention.

For each bitstream, i.e. one for each input and one for each output, a respective pointer block 100, schematically illustrated in FIG. 4, clocked by the respective frame synchronization signal Frame_Synch, is used to control which frame page of the respective frame buffer is addressed for frame writing or selective reading. In each pointer block 100, a free running counter 102 increments the selected frame page address, in a modulo-3 fashion on every reception of the respective frame synchronization signal, thus sequentially providing the frame page pointer addresses 0, 1, 2, 0, 1, 2, ..., and so on. Each pointer block 100 also receives a page offset signal (for example as given by the values provided in the fourth column 18 of the slot mapping table in FIG. 3) having a value which is added (also in modulo-3 fashion) to the value of the free running counter in a modulo-3 adder 104 to provide a resulting frame page select signal, as will be discussed further below with reference to FIGS. 5a and 5b.

The sequential designation of frame pages of a frame buffer for the writing of frames of the respective bitstream there into is accompanied by a corresponding sequential designation of frame pages of the frame buffers for the selective reading of time slot data therefrom. For each frame buffer there will be provided one write pointer (associated with the writing of the respective input bitstream) and M read pointers (each associated with the selective reading for the respective output bitstream, M being the number of output bitstreams).

It is important that the designation of frame pages for writing and the designation of frame pages for selective reading are performed so that buffer consistency is maintained to avoid reading time slot data of a frame before the writing thereof is completed. Such consistency is achieved by the use of three frame pages storage for each bitstream frame buffer, thus making it possible to always keep a minimum distance of half a frame between the writing and reading of each time slot data, as will be discussed further with reference to FIGS. 5a and 5b.

In the pointer block 100 of FIG. 4, when used at an output port for the selective reading of frames, the tree running counter frame page address is optionally modified by the provision of a page offset signal received from the slot mapping table, as mentioned above with reference to FIG. 3. The frame page offset signal is derived from the frame page offset column (18 in FIG. 3) of the slot mapping table and modifies the address of the pointer block by the adding of an offset thereto, also in modulo-3 fashion, to form an offset page address. Hence, the frame page offset signal is specified on a per slot basis depending on frame synchronization phase skew (i.e. the phase difference between the frames of the input and output bitstream), and access restriction criteria. Access restrictions are restrictions imposed on the time switching to reduce the latency through the switch at the cost of limiting the possible time re-mapping. The frame synchronization phase skew is in the range −1<skew<1, expressed as a part of a total frame.

Figure 5A:
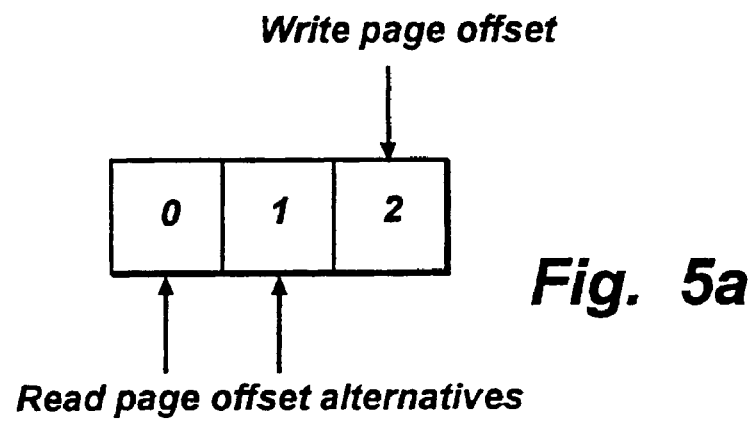
FIGS. 5a and 5b schematically show page offsets in full re-mapping mode and in bypass mode, respectively.

FIGS. 5a shows the assignment of page offsets during so called full re-mapping, i.e. when no access restrictions apply, which is also called a standard or normal mode. In FIG. 5a, it is assumed that the frame page offset of the pointer block for the writing of an input bitstream, designating the sequential selection of frame buffer frame page, is set to 2, meaning that after the reception of the next frame synchronization signal of the input bitstream, the writing will shift to actual buffer frame page 0 (=2+1 in modulo-3). The selective reading from the frame buffer may then access memory areas using either 0 or 1 as page offset alternatives depending on the frame synchronization phase skew. When operating at a negative phase skew, meaning that the frame synchronization signal of the output bitstream appears before that of the input bitstream, the page offset is set to 0 (the bottom -left alternative pointer arrow in FIG. 5a). Thus, the selective reading will always have time to jump to the next frame page and will not be caught up by the writing pointer later moving into a new frame page. When operating at a positive phase skew, i.e. when the output bitstream frame synchronization signal arrives after the input bitstream frame synchronization signal, the page offset is set to 1 (the bottom-right alternative pointer arrow in FIG. 5a). As is understood, this corresponds to adding one frame page (one frame) buffer margin between the writing and the reading. Also, these assignment rules ensure that when the read frame page pointer advances to a new page, the write updating of the new frame page will already be completed. It also means that the update writing pointer will not wrap around and catch up by entering the frame page that is being read before the read pointer has continued to the next frame page.

Figure 5B:
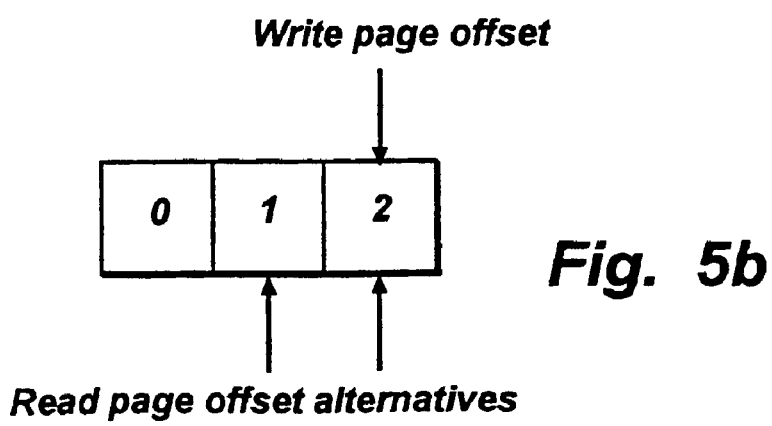

FIG. 5b shows the assignment of frame page offsets in a so called bypass mode, which may be actuated by the data of the fourth column 18 of the slot mapping table in FIG. 3. As is understood, in the normal mode, as discussed above with reference to FIG. 5a, the switch allows full re-mapping of data from first incoming slot to last outgoing slot and vice versa, but that requires buffering not only a write page and a read page but also one extra frame (the third page) to guarantee consistency, which hence introduces propagation latency through the switch. In the bypass mode, the latency through the switch may be reduced by one frame for one or more time slots of the frame at the cost of restrictions in the time re-mapping, as is discussed below. Hence, in the bypass mode shown in FIG. 5b, the normal mode page offset of FIG. 5a is temporarily incremented by one (1) for individual one or more time slots of a frame, which consequently allows the selective writer and the selective reader to temporarily use the same page, as is illustrated in FIG. 5b by the shifting of the alternative read pointer arrows one step to the right as compared to FIG. 5a.

Of course, this bypass mode may only be allowed under the restriction that the selective reader does not read ahead of the sequential writer, which is ensured if no outgoing time slot, of an output bitstream, receives data from an incoming time slot, of an input bitstream, having a higher time slot sequence number. Thus, outgoing slot #9 may use the bypass mode to reduce latency through the switch when reading data from an incoming slot #3, but outgoing slot #3 may not use the bypass mode to read data from an incoming slot #9.

In fact, this requirement for bypass may be relaxed when taking the actual skew into account. For simplicity, it is now assumed that the skew is expressed in time slots. When the skew is positive, i.e. when the frame synchronization signal of the input bitstream appears before that of the output bitstream, (the writing synch is ahead of the selective reading synch), the skew may be used to allow reading of time slot data for output time slots from input time slots with higher sequence numbers, as long as the switch does not reference ahead of the skew. With negative skew, i.e. when the frame synchronization signal of the output bitstream appears before that of the input bitstream (the writing is ahead of the selective reading), the normal mode has already added a margin of one frame, which means that if the skew is almost zero but negative, almost full bypass remapping is allowed. On the other hand, when the skew is almost negative one, no bypass reference ahead is allowed. This is concluded in the Table I below.

TABLE I

| MODE | SKEW | LATENCY | MAPPING CONSTRAINTS |
|---|---|---|---|
| Standard | Positive | 1 Frame + Skew | None |
| Standard | Negative | 2 Frames - ABS (Skew) | None |

TABLE I-continued

| MODE | SKEW | LATENCY | MAPPING CONSTRAINTS |
|---|---|---|---|
| Bypass | Positive | Skew | Input slot # - Output slot # < Skew |
| Bypass | Negative | 1 Frame - ABS (Skew) | Input slot # - Output slot # < skew |

As is understood, the frame synchronization and page select mechanisms described with reference to FIGS. 4, 5a, and 5b are preferably used in the embodiment of FIG. 2, although such elements are not explicitly shown therein, and are also incorporated in the embodiment described below with reference to FIG. 6.

Another embodiment of a switch according to the present invention, incorporating the features described with reference to FIGS. 2, 3, 4, 5a, and 5b above, will now be described with reference to FIG. 6, wherein a switch apparatus Sw is arranged to switch time slot data between N input bitstreams and M output bitstreams. For ease of description, since the switching from one of the N input bitstreams to the M output bistreams shows the same configuration as the switching of the other input bitstreams, and since the selective reading from the N input bitstream frame buffers to each one of the M output bitstreams show the same configuration, as illustrated in FIG. 2, only elements primarily associated with one input bitstream and one output bitstream are shown in FIG. 6, and the description of the switch apparatus in FIG. 6 is thus limited accordingly.

Figure 6:
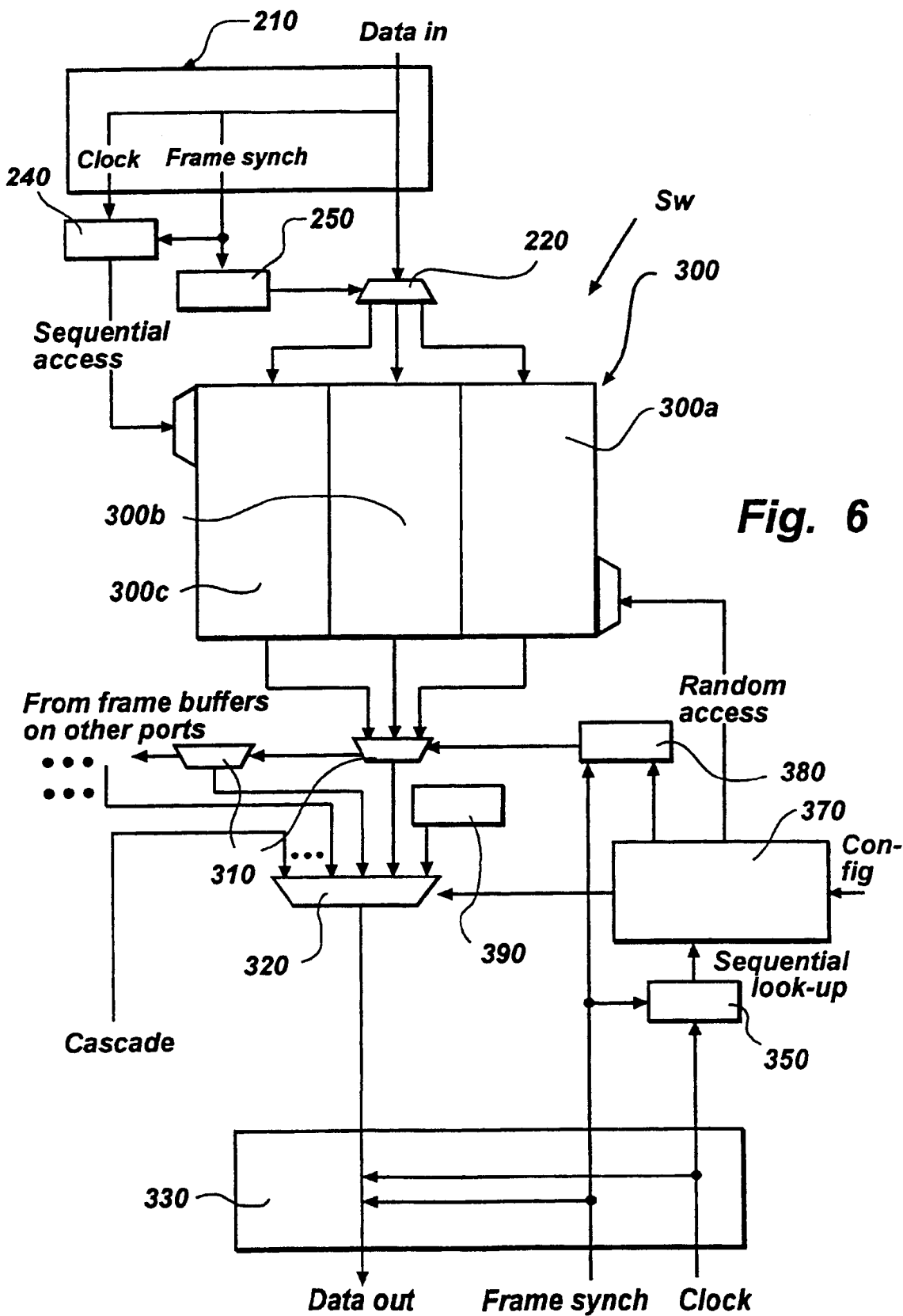
FIG. 6 schematically shows a portion of a switch apparatus according to an alternative embodiment of the invention.

In FIG. 6, an input bitstream is received at an input port 210 of the switch Sw and is provided to an input demultiplexor 220. A frame synchronization unit of the input port derives the frame synchronization signal from the input bitstream and, based thereupon, synchronizes the operation of a write slot counter 240 and a write page selecting unit 250. Also, a clock unit of the input port 210 is arranged to provide a signal occurring at the time slot frequency to the write slot counter 240. The write frame page selecting unit 250 is arranged to control the demultiplexor 220, at the rate of the frame synchronization signal, to have each frame of the input bitstream sequentially passed on to one of three frame pages (or "memory areas") 300a, 300b, and 300c of a frame buffer 300 for said input bitstream in a modulo-3 fashion. While the write page selecting unit 250 and the input demultiplexor 220 control which page of the frame buffer that a specific frame of the input bitstream is being written into, the write slot counter will control which entry of the page that time slot data from each specific time slot of a frame is written into. As is understood, this described set of components will be found at each input bitstream port of the switch Sw.

The output part of the switch, as shown on the lower part of FIG. 6, comprises, for each output bitstream, a first set of M output multiplexors 310, a second output multiplexor 320, an output port 330, an output slot counter 350, a slot mapping table 370, a frame page selecting unit 380, and an idle slot pattern generator 390.

The output port 330 derives a frame synchronization signal, either from the outgoing bitstream (if a synchronization already exists on said bitstream, said bitstream then originating from a node located upstream with respect to the switch), or by the internal generation of a frame synchronization signal (if the switch is the starting point of the outgoing bitstream).

The frame synchronization signal is provided to synchronize the operation of the output slot counter 350 and the frame page selecting unit 380. The output port also derives a clock signal occurring at the time slot frequency to the output slot counter 350. The output slot counter 350 sequentially addresses the entries of the slot mapping table 370, stepping through the slot mapping table once for each frame. Thus, for a specific output time slot of the output bitstream, the output slot counter will point at a respective entry of the slot mapping table 370. The slot mapping table will then provide three signals based upon the readouts from this entry, as has been discussed above, one designating the input bitstream from which time slot data for the time slot is to be collected, which signal is sent to the second output multiplexor 320, one designating which time slot in the recurring sequence of time slots within a frame of the input bitstream that the time slot data is to be collected from, which signal is sent to all N frame buffers, and one signal designating which page offset is to be used, which signal is sent to the frame page selecting unit 380, as have been discussed above with reference to FIGS. 3, 4, 5a, and 5b.

First, the selected input time slot number for the presently processed output time slot, for example input slot number i, is provided from the slot mapping table 370 to each one of the N frame buffers (only one is shown in FIG. 6) in random access, thus causing the readout of the i:th entry from each one of the three pages of each one of the N frame buffers (thus giving a total readout from 3×N data fields). The three readouts of each frame buffer is then sent to said first set of output multiplexors 310, each multiplexor 310 receiving time slot data from three pages of the associated frame buffer. The frame page select unit 380 is then arranged to control said first set of output multiplexors 310, at the rate of the frame synchronization signal, to decide which time slot data, corresponding to respective pages, that at any given time is to be passed on by the multiplexors 310, taking into account the presence of any frame page offset or bypass instruction as received from the slot mapping table. Hence, each of the first output multiplexors 310 will provide time slot data from one field of the respective frame buffer, giving a total of N readouts of time slot data being passed on to the second output multiplexor 320. In the second multiplexor, it is decided which one of said N readouts, i.e., from which bitstream, as designated by the bitstream selection signal from the slot mapping table 370. Thus, the slot mapping table 370 and the frame page selection unit 380 use said first and second multiplexors 310, 320 to retrieve a specific selected time slot data field from a selected one of the frame buffers.

Also, as is shown in FIG. 6, an idle slot pattern a cascade input are provided to the second output multiplexer. Accordingly, the slot mapping table 370 may instruct, for any specific time slot of the outgoing bitstream, the second output multiplexor 320 to transmit an idle slot pattern from the idle slot pattern generator 390 to the output bitstream, for example for the second, unallocated slot of the slot mapping table of FIG. 3. Note, however, that the fact that a time slot is unallocated does not necessarily mean that an idle pattern should be sent, as the slot may very well be allocated to be used by other nodes attached to the output bitstream. In order to accommodate the possibility of connecting several switches of this kind into a larger switch, the cascade input may be used. Then, an output bitstream from another switch is connected to the cascade input of the second multiplexor, thus making it possible to switch data from said another switch to the output bitstream of the switch Sw, still as controlled by the slot mapping table 370. The cascading possibility allows implementation of larger clustered switches using a number of smaller ones, e.g. the use of four 4×4 switches to implement one full 8×8 switch.

A configuration signal from a node controller controlling the updating of the slot mapping table is provided thereto, as illustrated by the arrow denoted Config in FIG. 6 and as will be described below with reference to FIGS. 7, 8a, and 8b.

As is understood, this described set of output components 310–390 will be found at each one of the M output bitstream ports of the switch, thus for example giving a total of N×M first output multiplexors and a total of M second multiplexors.

As has been described above, at the output from each one of the frame buffers, a first level multiplexor is used for selecting data from the three frame pages thereof. The results are then fed to a second level mutliplexor to select from a specific bitstream (input port). This scheme serves the purpose of illustrating a) that data is transferred on lines private to each output, thus avoiding the need for sharing a common medium, and b) the distinct parameters that control the selection.

However, considering the hardware cost for routing many wide buses, other building blocks than multiplexors may be considered. Therefore, in an alternative embodiment, a tri-state or a pre-charged bus is used instead of the multiplexors to serve the same purpose as the multiplexors but with a much better area utilization. When using standard random access memory (RAM) modules to implement the frame buffers, tri-state outputs are usually already included. It should be noted that such an embodiment does not require any additional means for mutual exclusion. At each instant, the source that is allowed to drive the bus is uniquely specified. In such an embodiment, a signal for enabling a driver is generated from a decoder block which has the input port (as read form the slot mapping table) and the frame page pointer (0, 1, 2) as input.

Similarly, instead of the input demultiplexors providing frames of the input bitstream to the respective frame page of the frame buffer these input demultiplexors may also be replaced by one bus feeding all three pages, wherein a write enable signal selects which one is written.

A procedure for updating the slot mapping tables of a switch according to the invention will now be described with reference to FIGS. 7, 8a, and 8b. As the channels or time slots to be switched between the different bitstreams change due reallocation of resources, the slot mapping tables of the switch are updated either using a central unit within the switch or through an external interface by a computer controlling the switch, such a central unit or computer often being referred to as a node controller (NC). In the case of an externally provided computer, the external interface is separated from the ports of the switch, and the bandwidth for slot mapping table updates is generally considerably lower than the bandwidth of the switch ports.

A problem when updating slot mapping tables on several outputs with different frame phases is to maintain consistency, which for example is required when reallocating a multicast channel. One advantageous way of solving this problem, which of course is not limited to the updating of multicast channels on multiple output ports, is shown in FIGS. 7, 8a, and 8b, wherein FIG. 7 shows three updating tables addressed by the node controller, FIG. 8a shows a flow chart of the updating operation of the node controller, called global update, and FIG. 8b shows a flow chart of the updating operation of each one of the slot mapping tables, called local update.

Figure 7:
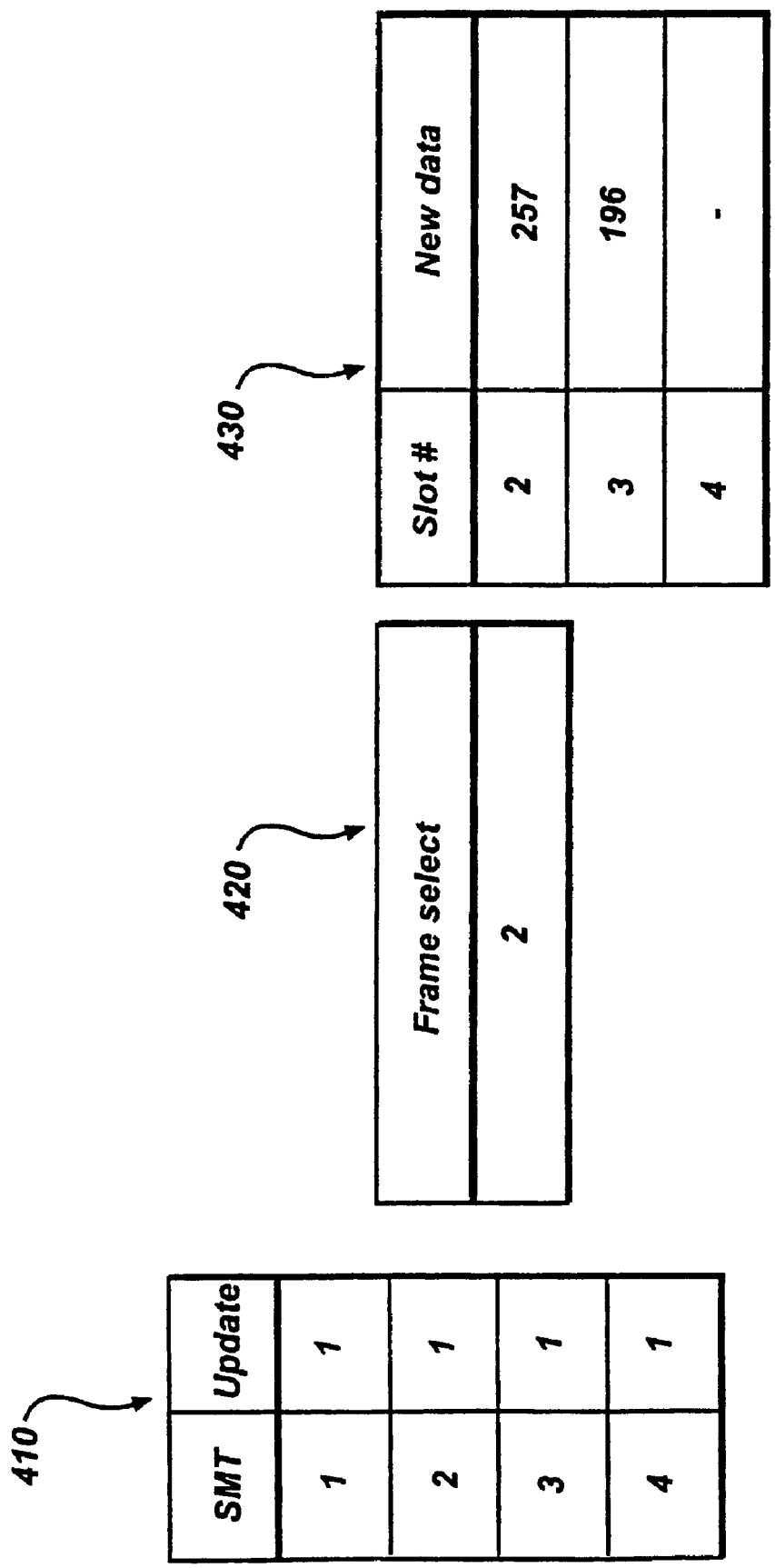
FIGS. 7, 8a and 8b schematically show a mechanism for updating the slot mapping tables of the kind shown in FIG. 3.
Figure 8B:
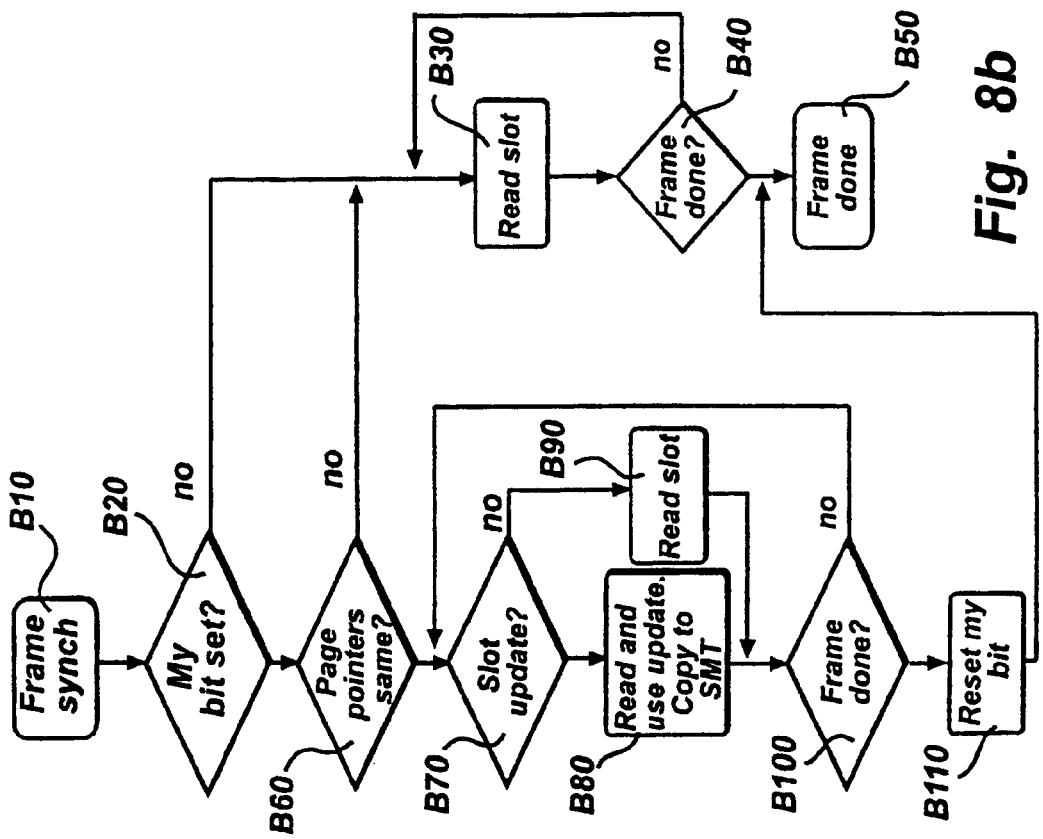
Figure 8A:
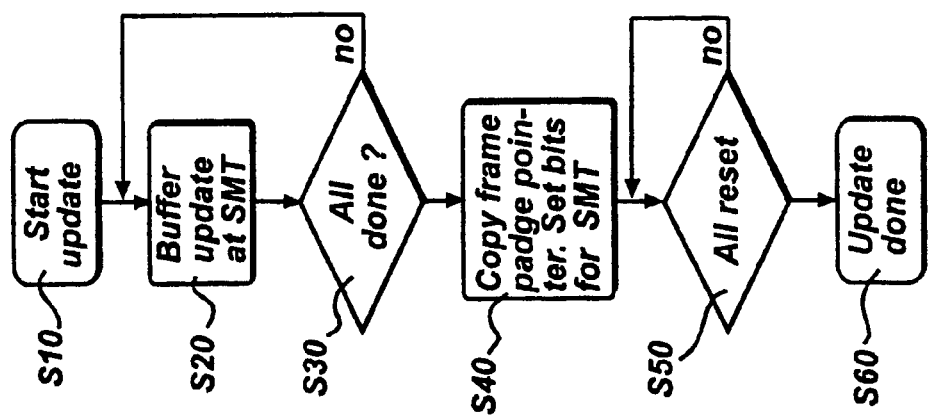

When starting an updating procedure, step S10 in FIG. 8a, the node controller will address updating tables 410, 420, and 430 shown in FIG. 7, which for example may be provided within the node controller or within the switch in communication with the node controller. First in step S20, the node controller will provide tables 430 (one table 430 for each slot mapping table) with a set of entries designating which output time slots in the sequence of output time slots that is to be updated in the respective slot mapping table and which corresponding data that is to substitute the old data at the respective entries of said slot mapping table. Having preset all subject updates for all subject slot mapping tables in this manner, as is decided in a step S30, the node controller will instruct the slot mapping tables to update their content by setting a set of flags, one for each slot mapping table, to one (1) in a table 410 (the table 410 in FIG. 7 representing indications to four slot mapping tables). It also provides a frame select table 420 with information designating at which selected frame, in the modulo-3 order of frames, that the slot mapping tables shall update their content.

In correspondence, at the start of each frame, which is indicated by the reception of a frame synchronization signal in step B10, each slot mapping table will investigate its flag in table 410, in step B20, to see whether or not its slot mapping table shall be updated. If not, i.e. if the flag belonging to the slot mapping table is set to zero (0), the slot mapping table will proceed to instruct the selective readout of time slot data from the input frame buffers in steps B30, B40, and B50, in the general manner described above. However, if the flag indicates that updating is requested, i.e. if the flag belonging to the slot mapping table is set to one (1), the slot mapping table will check the frame select table 420 in step B60 to see whether or not the slot mapping table shall be updated at the start of the current frame or at the start of a later frame. If the updating shall not take place until a later frame, the slot mapping table will proceed to instruct the selective readout of time slot data from the input frame buffers in the general manner described above. However, if the frame select table 420 indicates that updating is to take place during the present frame, the slot mapping table will start processing time slots as usual, but for each time slot entry check, in step B70, its updating table 430 to see whether or not the entry of the subject time slot is to be updated, and if so, update the entry with the information provided in the updating table 430 before executing the selective readout. When having stepped through the entire frame in this manner, the slot mapping table will reset its updating flag in table 410, thus informing the node controller that its updating is complete.

Correspondingly, the node controller will repeatedly check the updating table 410, in step S50, to see whether or not all slot mapping tables have reset their flags. Having decided so, i.e. when all the flags of table 410 have been reset to zero (0), the updating procedure is completed in step S60.

This updating procedure is designed to reduce the number of resynchronized signals, i.e. signals from other clock domains synchronized with one. The selected synchronization can be based upon one set-reset flip/flop for each output. Each reset is then controlled by the local slot mapping table update procedure.

In an alternative embodiment, instead of updating single time slots of the updating table, the node controller may provide data for an entire new frame, thus simply instructing the slot mapping tables to switch the entire frame of data. However, the number of time slots of a frame may prove this embodiment to be far too time consuming as compared to only updating a subset of time slots.

Even though the invention has been described above with reference to exemplifying detailed embodiments thereof, different modifications, alterations and combinations of the features disclosed herein may be made, as is understood by those skilled in the art, within the scope of the invention, which is defined by the accompanying claims.

What is claimed is:

1. A method for switching data in time and space between a set of input bitstreams and a set of output bitstreams in a circuit switched time division multiplexed network, each of said bitstreams being divided into recurring frames and each of said frames being divided into time slots, said method comprising the steps of:

receiving each one of said input bitstreams;

temporarily storing frames of time slot data from said input bitstreams, wherein frames from different input bitstreams are stored in respective memory means of a set of memory means;

providing each time slot of an output frame of each one of said output bitstreams with an identification designating whether or not the respective time slot of said output bitstreams is to receive time slot data from any one of said input bitstreams and, if so, from which time slot data entry of said memory means that said time slot data is to be collected;

selectively reading, for each output frame of each one of said output bitstreams, time slot data from the frames temporarily stored in said set of memory means in accordance with said identification of each time slot, wherein said selective reading for each of said output bitstreams is performed independent of the other output bitstreams, and wherein said selective reading causes the time slot data to be read sequentially in accordance with the order that said time slot data are to be transmitted in the respective output frame; and transmitting said time slot data, as selectively read from said temporarily stored frames, into allocated time slots of said output bitstreams.

2. A method as claimed in claim 1, wherein said independency is provided by performing said selective reading over lines private to each output bitstream.

3. A method as claimed in claim 1, wherein said step of temporarily storing comprises temporarily storing time slot data from respective recurring time slot positing in the sequences of time slots of said input bitstreams in respective time slot data entries of said memory means.

4. A method as claimed in claim 1, wherein said step of selectively reading comprises the steps of:

reading, for sequential time slots of a frame of a bitstream of said output bitstreams, respective provided identifications of time slot data entries of said set of memory means, said time slot data entries providing time slot data for said time slots; and selectively reading, for said time slots of said frame, time slot data from said time slot data entries based upon said identifications.

5. A method as claimed in claim 1, comprising the steps of receiving an additional bitstream and reading, for a time slot of a frame of at least one bitstream of said output bitstreams, said time slot being allocated to receive time slot data from said additional bitstream, time slot data from said additional bitstream based upon an identification indicating that said time slot is arranged to receive time slot data from said additional bitstream.

6. A method as claimed in claim 1, comprising the step of providing each time slot of a frame of each one of said output bitstreams with an identification designating whether or not the respective time slot of said output bitstreams is to receive time slot data from any one of said input bitstreams and, if so, from which time slot data entry of said memory means that said time slot data is to be collected.

7. A method as claimed in claim 1, comprising the step of providing a set of identification updates and associated timing information relating to when said identifications are to be updated using said identification updates, and updating said identifications with said set of identification updates at the timing designated by said associated timing information.

8. A method as claimed in claim 1, comprising the steps of, for each one of said input bitstreams, detecting a frame synchronization signal and, based thereupon, synchronizing said temporary storing of frames into the respective memory means of said set of memory means.

9. A method as claimed in claim 1, comprising the steps of, for each one of said output bitstreams, determining a frame synchronization and, based thereupon, synchronizing said selective reading of time slot data and the transmitting thereof into the respective output bitstream.

10. A method as claimed in claim 1, wherein said step of temporarily storing comprises temporarily storing three sequential frames of each one of said input bitstreams.

11. A method as claimed in claim 10, comprising the step of indicating, at each given point in time, which ones of the temporarily stored three sequential frames of each one of said input bitstreams that are currently being written into storage.

12. A method as claimed in claim 10, comprising the step of indicating, at each given point in time, which ones of the temporarily stored three sequential frames of each one of said input bitstreams, that are currently used for the selective reading of time slot data for said output bitstreams.

13. A method as claimed in claim 1, wherein channels on said bitstreams are defined by a respective set of time slots in each frame of the respective bitstream, said time slots being dynamically allocated based upon dynamically changing capacity requirements of the nodes of the network.

14. An apparatus for switching data between a set of input bitstreams and a set of output bitstreams in a circuit switched time division multiplexed network, each of said bitstreams being divided into recurring frames and each of said frames being divided into time slots, said apparatus comprising:

input means for receiving each one of said input bitstreams;

a set of memory means, each memory means being arranged for temporarily storing frames of a respective bitstream of said input bitstreams;

means for selectively reading, for each output frame of each one of said output bitstreams, time slot data from the frames temporarily stored in said set of memory means, wherein said selective reading for each bitstream is performed independent of the other bitstreams, and wherein said selective reading causes the time slot data to be read sequentially in accordance with the order that said time slot data are to be transmitted in the respective output frame; and output means for transmitting said time slot data, as selectively read by said means for selectively reading, into allocated time slots of said output bitstreams.

15. An apparatus as claimed in claim 14, wherein each one of said memory means is provided with multiple read ports, and wherein each one of said read ports is arranged to serve a respective one of said output bitstreams.

16. An apparatus as claimed in claim 14, wherein said means for selectively reading comprises a set of reading means, each reading means being arranged to read time slot data for a respective bitstream of said output bitstreams.

17. An apparatus as claimed in claim 14, wherein each memory means of said set of memory means comprises a plurality of time slot data entries and wherein each time slot data entry of a memory means of said set of memory means is arranged to store time slot data from a respective recurring time slot position in the sequence of time slots of the input bitstream that is associated with said memory means.

18. An apparatus as claimed in claim 14, wherein said means for selectively reading comprises means for providing, for each one of said output bitstreams, and for those time slots thereof that are allocated to receive time slot data from said input bitstreams, respective identifications of time slot data entries of said set of memory means, wherein said means for selectively reading are arranged to read time slot data for said time slots from said time slot data entries in accordance with said identifications.

19. An apparatus as claimed in claim 14, comprising means for receiving an additional bitstream and means for providing a time slot of a frame of at least one bitstream of said output bitstreams, said time slot being allocated to receive time slot data from said additional bitstream, with an identification related to said additional bitstream for the provision of time slot data therefrom, wherein said means for selectively reading is arranged to read time slot data for said time slot from said additional bitstream based upon said identification.

20. An apparatus as claimed in claim 14, wherein said means for providing identifications is arranged to provide each time slot of a frame of each one of said output bitstreams with an identification designating whether or not the said time slot is to receive time slot data from any one of said input bitstreams and, if so, from which time slot data entry, of said set of memory means, that said time slot data is to be read.

21. An apparatus as claimed in claim 14, comprising: means for storing a set of identification updates and for storing associated timing information as to when said identifications are to be updated using said identification updates; and means for updating said identifications using said set of identification updates at the timing designated by said associated timing information.

22. Apparatus as claimed in claim 14, comprising input frame synchronization means for detecting frame synchronization signals for each respective one of said input bitstreams and for synchronizing, based upon said frame synchronization signals, said temporary storing of frames into respective memory means of said set of memory means.

23. An apparatus as claimed in claim 14, comprising output frame synchronization means for determining frame synchronization for each respective one of said output bitstreams and for synchronizing, based thereupon, the selective reading of time slot data from said set of memory means and the transmitting thereof into the respective output bitstream.

24. An apparatus as claimed in claim 14, wherein each one of said memory means comprises three frame storage areas for sequentially and temporarily storing three sequential frames of the respective input bitstream.

25. An apparatus as claimed in claim 24, comprising write pointer means designating, at each given point in time, which frame storage areas, of said set of memory means, that are used for storing the frames that are presently being written from said input bitstreams into said set of memory means.

26. An apparatus as claimed in claim 24, comprising read pointer means designating, at each given point in time, which frame storage areas, of said set of memory means, that are currently used for the selective reading of time slot data for said output bitstreams.

27. An apparatus as claimed in claim 14, comprising means for momentarily offsetting the designation provided by said read pointer means for a time slots of said output bitstreams in order to read time slot data for said time slot from another frame storage area than the one designated by default by said read pointer means.

28. An apparatus as claimed in claim 14, wherein said memory means comprises a random access memory with multiple read ports.

* * * * *